(12) United States Patent
Ekholm et al.

(10) Patent No.: US 8,876,017 B2
(45) Date of Patent: Nov. 4, 2014

(54) VARIABLE FLOW SCREEN NOZZLE

(75) Inventors: Michael Ekholm, Minneapolis, MN (US); Richard C. Maxson, Maple Grove, MN (US)

(73) Assignee: Bilfinger Water Technologies, Inc., New Brighton, MN (US)

( * ) Notice: Subject to any disclaimer, the term of this patent is extended or adjusted under 35 U.S.C. 154(b) by 355 days.

(21) Appl. No.: 13/181,859

(22) Filed: Jul. 13, 2011

(65) Prior Publication Data
US 2012/0037730 A1 Feb. 16, 2012

Related U.S. Application Data

(60) Provisional application No. 61/372,622, filed on Aug. 11, 2010.

(51) Int. Cl.
| | |
|---|---|
| B05B 15/02 | (2006.01) |
| F23D 11/34 | (2006.01) |
| B01D 24/46 | (2006.01) |
| B01D 24/12 | (2006.01) |
| F16K 17/04 | (2006.01) |

(52) U.S. Cl.
CPC ........ *F16K 17/0406* (2013.01); *B01D 24/4636* (2013.01); *B01D 24/12* (2013.01); *B01D 24/4626* (2013.01)
USPC ... 239/119; 239/575; 137/513.7; 137/516.25; 137/512.1

(58) Field of Classification Search
CPC ....... B05B 15/0283; F16K 23/00; F16T 1/24; F16T 1/22
USPC .......... 239/119, 575; 137/202, 513.7, 516.25, 137/512.1
See application file for complete search history.

(56) References Cited

U.S. PATENT DOCUMENTS

| | | | |
|---|---|---|---|
| 3,006,376 A | | 10/1961 | Schulze et al. |
| 3,642,205 A | * | 2/1972 | Marty ........................ 239/119 |

(Continued)

FOREIGN PATENT DOCUMENTS

| | | |
|---|---|---|
| EP | 0443747 A2 | 8/1991 |
| WO | 91013670 | 9/1991 |

(Continued)

OTHER PUBLICATIONS

Extended Search Report received in corresponding European Patent Application No. 11250720.7, dated Nov. 16, 2012.
Examiner's first report received in corresponding Australian application No. 2011205111, dated Oct. 26, 2012.
Federal Screen, "Wedge Wire Screen—Water Filter Vessel—Media Retention Nozzles and Inlet Distributors," obtained from www.federalscreen.com, generated on Jul. 26, 2010.

(Continued)

*Primary Examiner* — Dinh Q Nguyen
(74) *Attorney, Agent, or Firm* — Moore & Van Allen PLLC

(57) ABSTRACT

A variable flow control nozzle has a head, a tube, and a valve. The head disposes adjacent an opening and has a screen for passage of fluid flow into and out of the head's interior. The tube extends from the head through the opening and secures the head thereto. A tube passage communicates the interior of the head with the other side of the opening. The valve disposed in the passage has a first condition permitting first fluid flow from the passage to the interior of the head and has a second condition permitting second fluid flow from the interior to the passage. The second fluid flow may be greater than the first fluid flow. The tube can have first and second tube members with different internal diameters, and the valve can use a ball movable between positions in the tube members.

25 Claims, 9 Drawing Sheets

(56) References Cited

U.S. PATENT DOCUMENTS

| | | | |
|---|---|---|---|
| 3,648,731 A * | 3/1972 | de Boerr | 137/550 |
| 3,684,192 A | 8/1972 | McMillan | |
| 3,730,348 A | 5/1973 | Weis et al. | |
| 4,416,773 A | 11/1983 | Davis et al. | |
| 4,476,020 A | 10/1984 | Cheetham | |
| 4,579,659 A * | 4/1986 | Eades et al. | 210/541 |
| 5,068,034 A | 11/1991 | Walter | |
| 5,545,319 A | 8/1996 | Hart et al. | |
| 5,658,459 A | 8/1997 | Guttormsen | |
| 5,762,093 A | 6/1998 | Whiley, II | |
| 6,561,481 B1 | 5/2003 | Filonczuk | |
| 6,730,229 B1 | 5/2004 | Pandya | |

FOREIGN PATENT DOCUMENTS

| | | |
|---|---|---|
| WO | 0119494 A1 | 3/2001 |
| WO | 2007050392 A1 | 5/2007 |

OTHER PUBLICATIONS

Haizxing Filter Screen Company, "Filter Strainer Type LT," obtained from www.haixing-filter.com, generated on Jul. 26, 2010.

Haizxing Filter Screen Company, "Filter Strainer Type LLT," obtained from www.haixing-filter.com, generated on Jul. 26, 2010.

Haizxing Filter Screen Company, "Filter Strainer Type ST," obtained from www.haixing-filter.com, generated on Jul. 26, 2010.

Orthos Liquid Systems, Inc., "Filter Nozzles/Strainers," Catalog, obtained from www.orthosnozzles.com, undated.

European Patent Office, European Application No. 11250720.7 Office Action dated Feb. 7, 2014, pp. 1-5.

Canadian Intellectual Property Office, Canadian Patent Application No. 2,747,179 Office Action dated Nov. 12, 2013, pp. 1-2.

Australian Patent Office, Australian Application No. 2011205111 Office Action dated Apr. 29, 2014, pp. 1-4.

\* cited by examiner

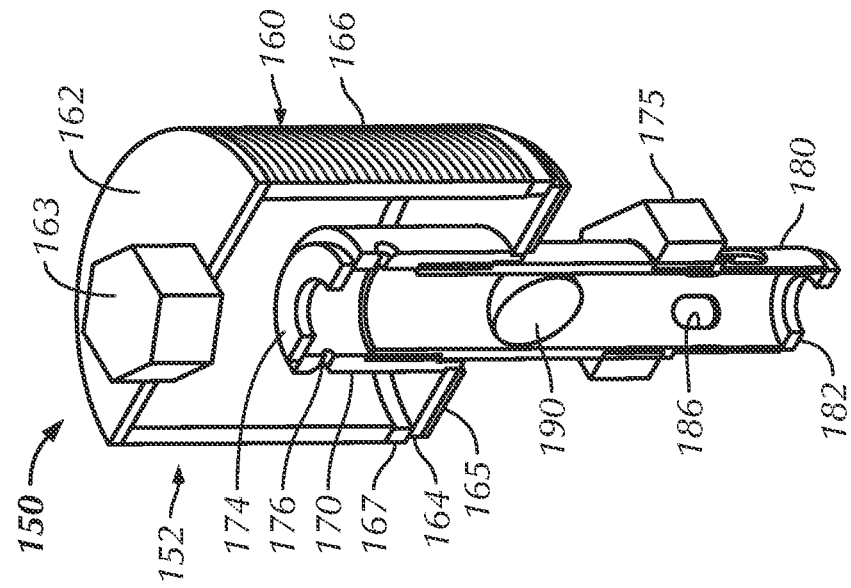
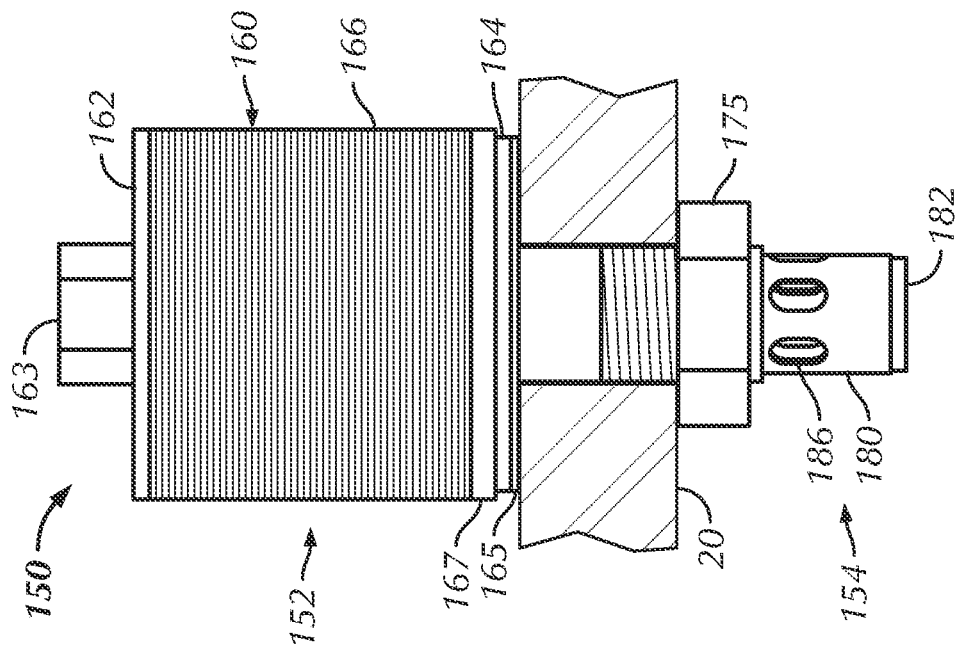
FIG. 5B
FIG. 5A

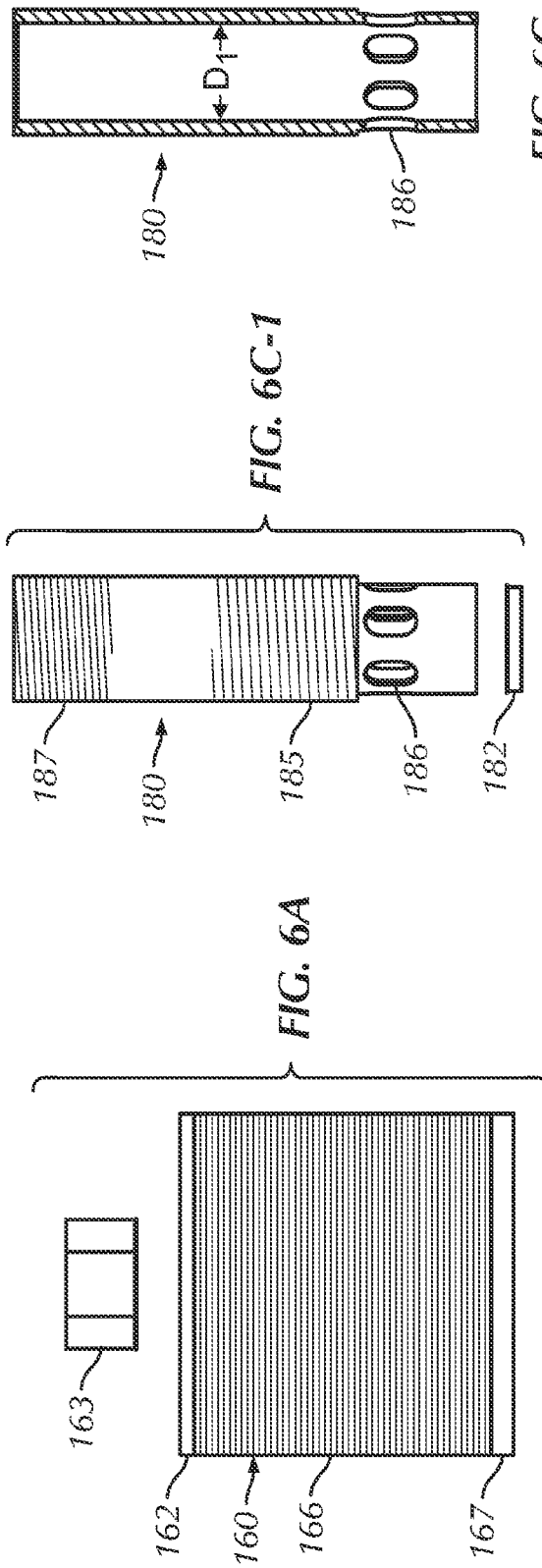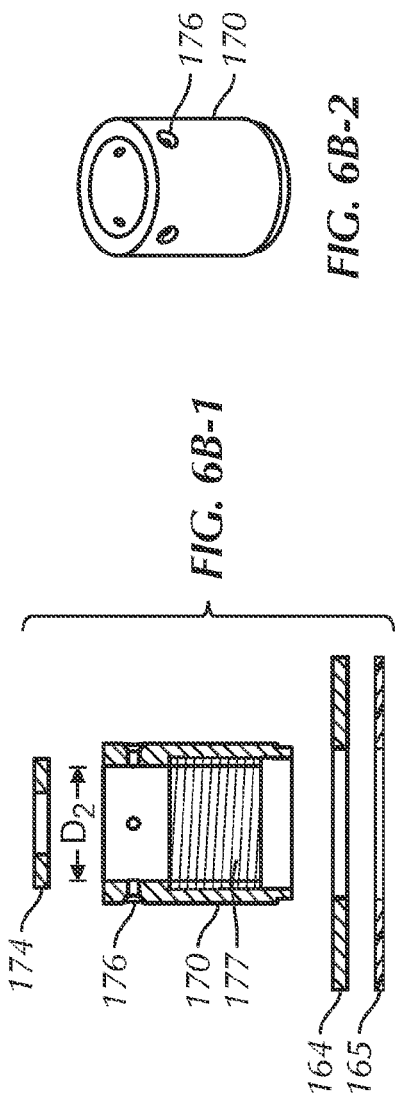

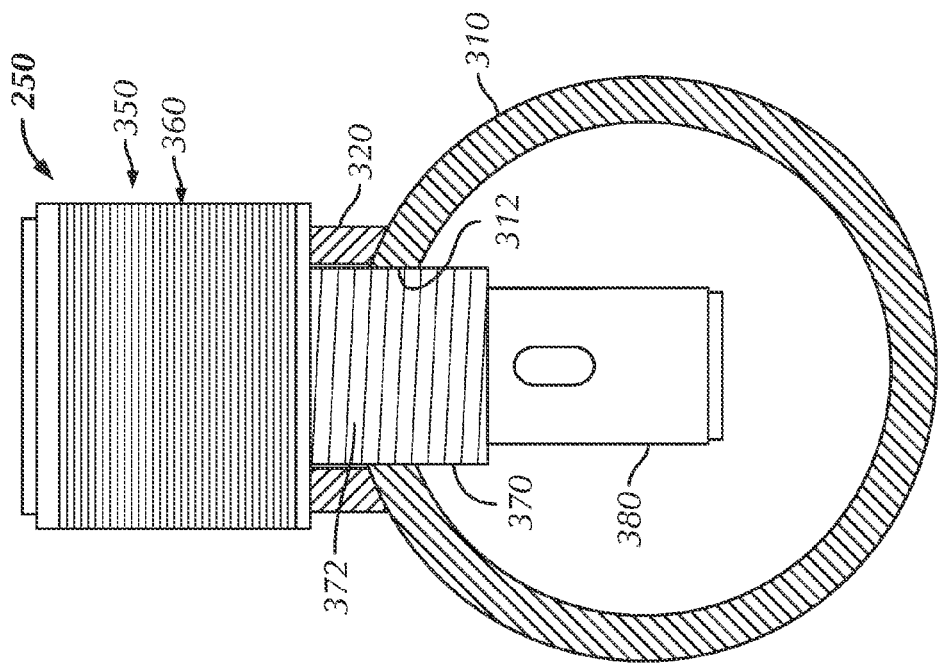
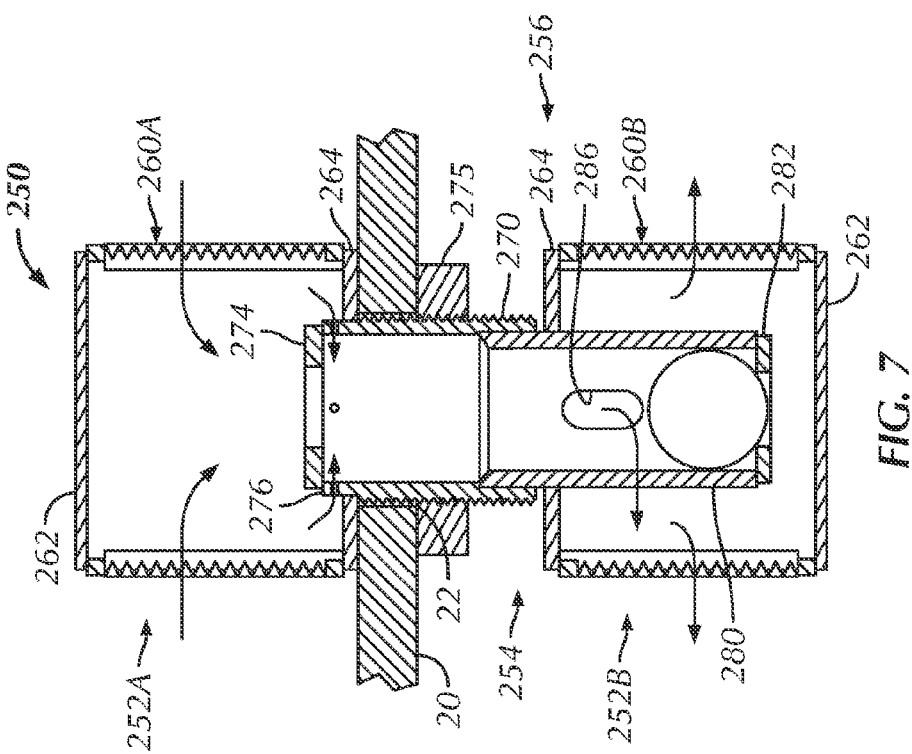
FIG. 8
FIG. 7

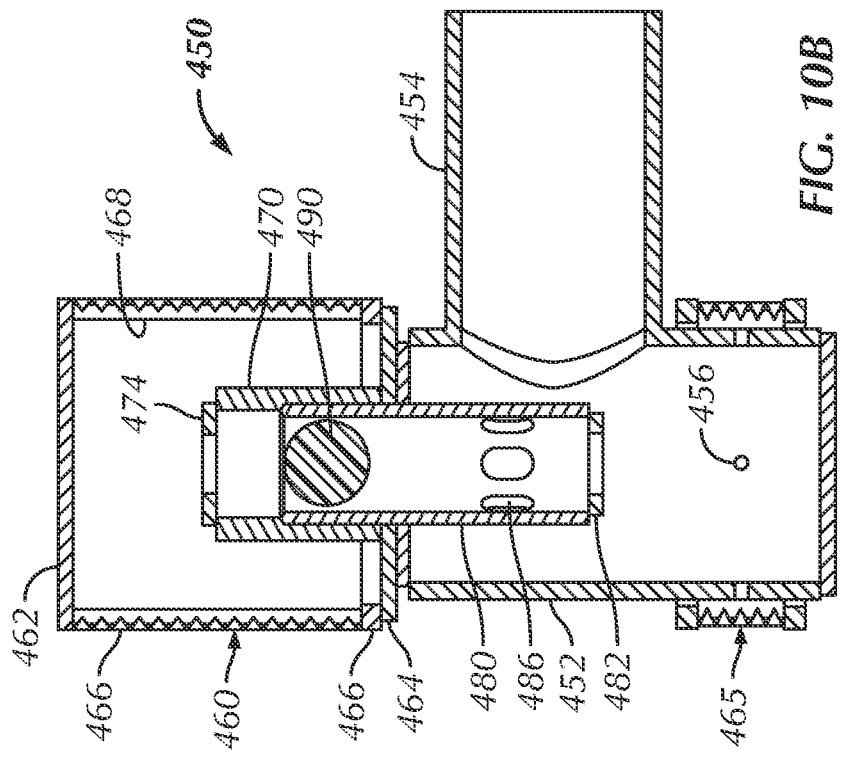
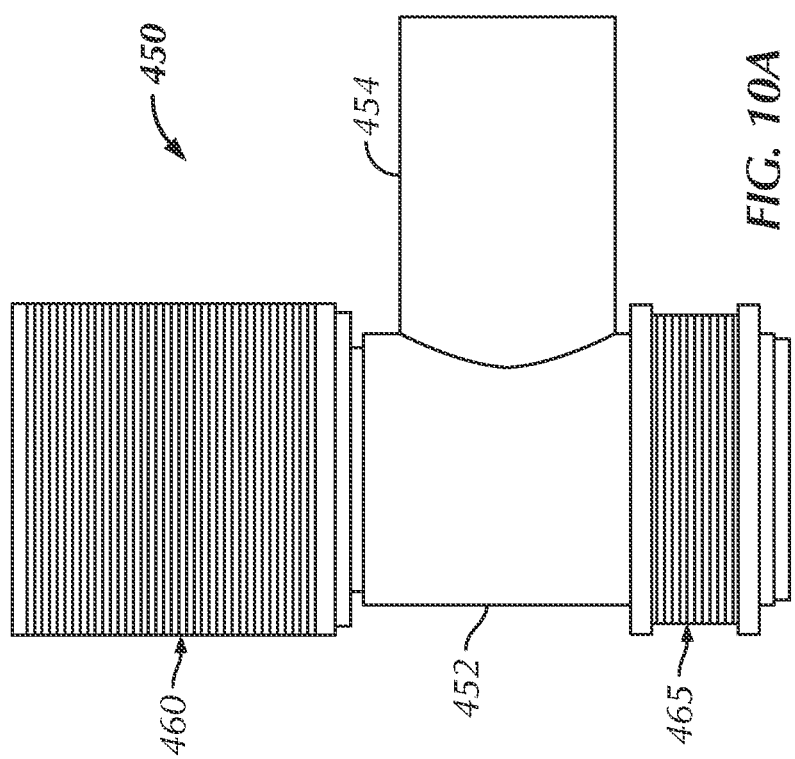

VARIABLE FLOW SCREEN NOZZLE

CROSS-REFERENCE TO RELATED APPLICATIONS

This is a non-provisional of U.S. Appl. Ser. No. 61/372,622, filed 11 Aug. 2010, which is incorporated herein by reference and to which priority is claimed.

BACKGROUND

Nozzles can be used in a vessel to control flow of liquids for a desired chemical process effect. Several nozzle designs are currently used in the industry. For example, nozzles are disclosed in U.S. Pat. Nos. 3,684,192; 4,476,020; 5,068,034; 5,658,459; and 6,561,481. Some commercially available nozzles include nozzles available from Orthos Liquid Systems.

In some resin processes, the flow rate can vary depending on the stage of the process. In the vessel, a false bottom or tube sheet can support the resin in the vessel. This tube sheet has holes drilled to accept screen nozzles that keep the resin from leaving the vessel during downflow (normal process flow) conditions. Periodically, it is desired to backwash the resin to clean or reactivate it. In some cases, this backwash flow is much less than the downflow condition. As it is desired that the screen nozzles be used to control distribution in both cases, the flow characteristics or resistance to flow must be adaptable to the backwash phase. This requires using nozzles that can vary in flow characteristics.

Although existing nozzles may be effective, they may be difficult to manufacture and may not achieve the desired flow characteristics. The subject matter of the present disclosure is directed to overcoming, or at least reducing the effects of, one or more of the problems set forth above.

SUMMARY

A variable flow control nozzle has a body, a screen, and a valve. The body has an interior and defines first and second seat openings and ports. The screen is disposed on the body and screens fluid flow into and out of the second seat opening and port. For its part, the valve is disposed in the interior of the body and is movable between first and second conditions. When the valve is in the first condition, it permits first fluid flow from the second seat opening and port out the first port. On the other hand, the valve in the second condition permits second fluid flow from the first seat opening and port out the second port. Overall, the first fluid flow can be greater than the second fluid flow, especially if the second fluid flow is for backwash.

As discussed below, the body can include a tube extending from the screen and defining a flow passage therein between the first and second seat openings and ports. The valve can be a plug, such as a ball, disposed in this flow passage and can move between first and second positions. In general, one or more of the nozzles can be used in a flow assembly having a flow barrier, such as a tube sheet, a pipe, and a header. In general, the flow barrier divides first and second processes (i.e., flows, mediums, etc.) from one another in a vessel, chamber, or the like. In this way, the one or more nozzles can provide variable flow control between the first and second processes.

For example, a variable flow control nozzle has a head, a tube, and a valve. The head disposes against or near one side of a surface opening and has a screen for passage of fluid flow into and out of an interior of the head. For example, the surface opening can be in a tube sheet of a vessel. Alternatively, the nozzle can connect to a pipe lateral of a lateral system.

The tube extends from the head through the surface opening and secures the head thereto. The tube has a flow passage communicating the interior of the head with an opposing side of the surface opening. The valve is disposed in the passage of the tube and has first and second conditions. In the first condition, the valve permits first fluid flow in a first direction from the flow passage to the interior of the head. In the second condition, the valve permits second fluid flow in a second direction from the interior to the flow passage, where the second fluid flow is greater than the first fluid flow.

The tube can have first and second tube members having different internal diameters. The valve can include a ball movable between first and second positions in the tube members. In particular, the ball in the first position seats in a first seat of the first tube member. Once seated, the ball still permits a first fluid flow rate in a first direction into the head through a first orifice, which can include side ports in the first tube member or slots in the first seat. The ball in the second position seats in a second seat and permits a second fluid flow rate in a second direction out of a second orifice. The second orifice can include one or more side ports in the second tube member.

The flow rate out of the nozzle may be less than the flow rate into the nozzle. Thus, the second fluid flow rate can be greater than the first fluid flow rate, although the opposite may be used in some implementations. Generally, the set of orifices not blocked by the valve element are intended to distribute a lower flow rate. The flow control provided by the nozzle with its valve element allows the same distribution performance for a higher flow rate. In this way, the nozzle can provide suitable performance for a wider range of flow conditions when implemented in a typical distributor/collector system such as a tube sheet or a header/lateral pipe based assembly.

The foregoing summary is not intended to summarize each potential embodiment or every aspect of the present disclosure.

BRIEF DESCRIPTION OF THE DRAWINGS

FIG. 5A is a side view of another variable flow screen nozzle according to certain teachings of the present disclosure.

FIG. 5B is a perspective view of the nozzle shown in cross-section.

FIG. 6A is a side view of the screen for the nozzle.

FIG. 6B-1 is a side view of the outer tube, upper seat, base plate, and gasket for the nozzle.

FIG. 6B-2 is a perspective view of the outer tube for the nozzle.

FIG. 6C-1 is a side view of the inner tube and lower seat for the nozzle.

FIG. 6C-2 is a cross-sectional view of the inner tube for the nozzle.

FIG. 7 is a cross-sectional view of another variable flow screen nozzle having dual screens on opposing sides of a surface opening.

FIG. 8 shows a variable flow screen nozzle threading onto a pipe.

FIG. 10A is a side view of the variable screen nozzle.

FIG. 10B is a cross-sectional view of the variable screen nozzle.

DETAILED DESCRIPTION

Figure 1:
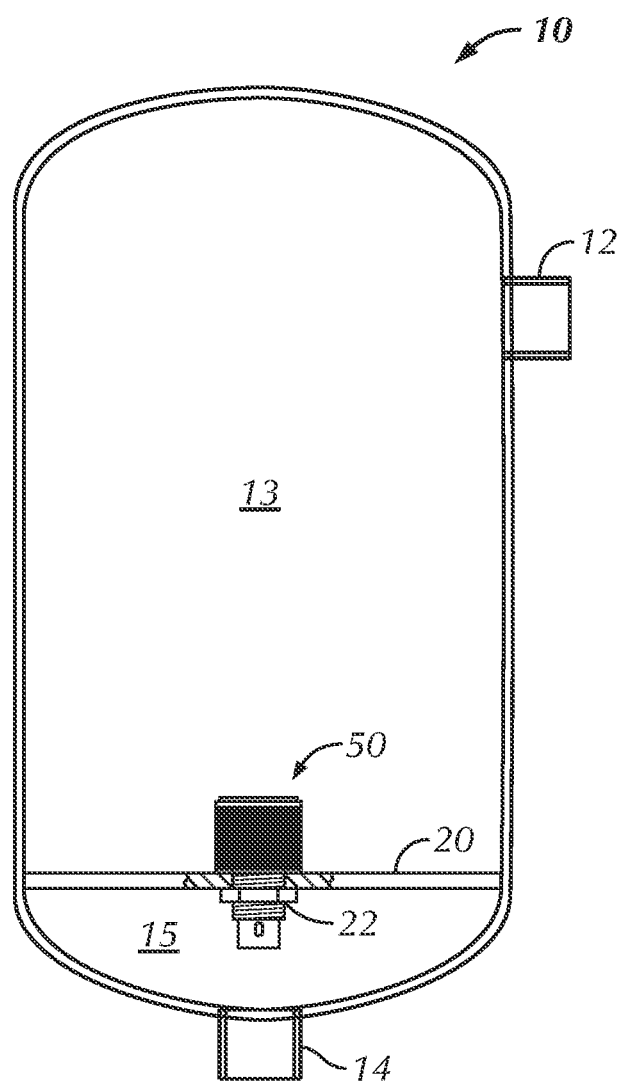
FIG. 1 shows a vessel having a tube sheet and a variable flow screen nozzle according to the present disclosure.

A variable flow screen nozzle 50 according to the present disclosure can be used in a vessel 10 as shown in FIG. 1 or in other applications. Here, the screen nozzle 50 mounts in a surface opening 22 of a tube sheet 22 or false bottom near the base or outlet 14 of the vessel 10. The tube sheet 20 can have a number of openings 22 so a number of the nozzles 50 can be mounted in the vessel 10, although only one is shown. Likewise, the nozzle 50 can be mounted on other process flow components, including pipe headers, floors, panels, or other flow barriers that separate one process flow or media from another.

As noted previously, a chemical resin can be used in the vessel 10 for a desired chemical process effect. The tube sheet 20 can support the resin in one portion 13 of the vessel 10 (e.g., communicating with the inlet 12 or the like), and the screen nozzle 50 keeps the resin from leaving the vessel 10 during downflow (normal process flow) conditions through the outlet 14 communicating with another portion 15.

Backwashing the resin to clean or reactivate it can be periodically desirable, and the backwash flow is sometime much less than the downflow condition. Preferably, the screen nozzle 50 can control flow distribution in both cases and has flow characteristics or resistance that adapts to the desired process phase. Accordingly, the disclosed nozzle 50 has variable flow characteristics as described below.

Figure 2B:
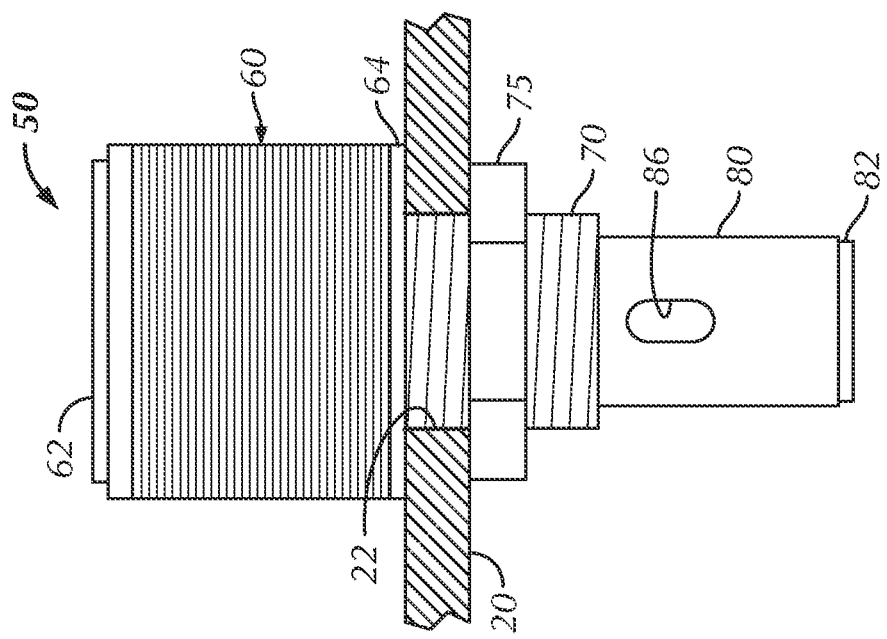
FIG. 2B is a side view of the of the variable flow screen nozzle mounted in an opening of a tube sheet.
Figure 2A:
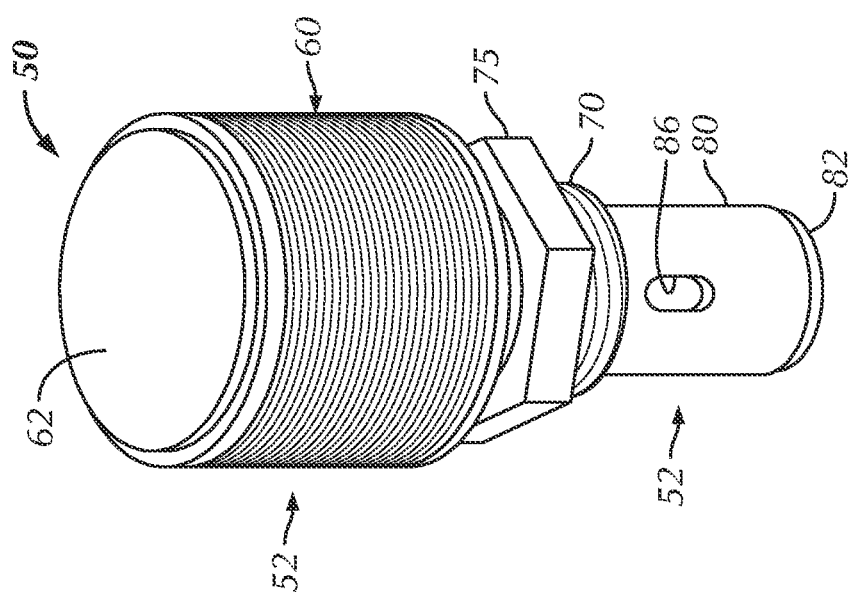
FIG. 2A is a perspective view of the variable flow screen nozzle.

As shown in FIGS. 2A-2B and 3A-3B, the variable flow screen nozzle 50 has a head 52 and a tube member 54 extending therefrom. As shown in FIG. 2B, the head 52 disposes adjacent or near one side of a surface opening 22 in a tube sheet 20 or the like. The head 52 has a screen 60 for passage of fluid flow into and out of an interior of the head 52. The tube member 54 extends from the head 52 through the surface opening 22 and secures the head 52 thereto. The tube member 54 has an internal flow passage communicating the interior of the head 52 with the opposing side of the surface opening 22.

To control flow, the nozzle 50 includes a valve 56 disposed in the flow passage of the tube member 54. The valve 56 has a first condition permitting fluid flow in a first direction from the tube member 54 to the interior of the head 52. The valve 56 has a second condition permitting second fluid flow in a second direction from the interior of the head 52 to the tube member 54. This second fluid flow corresponds to downflow or normal process flow and is greater than the first fluid flow, which corresponds to upflow or backwash.

Figure 3B:
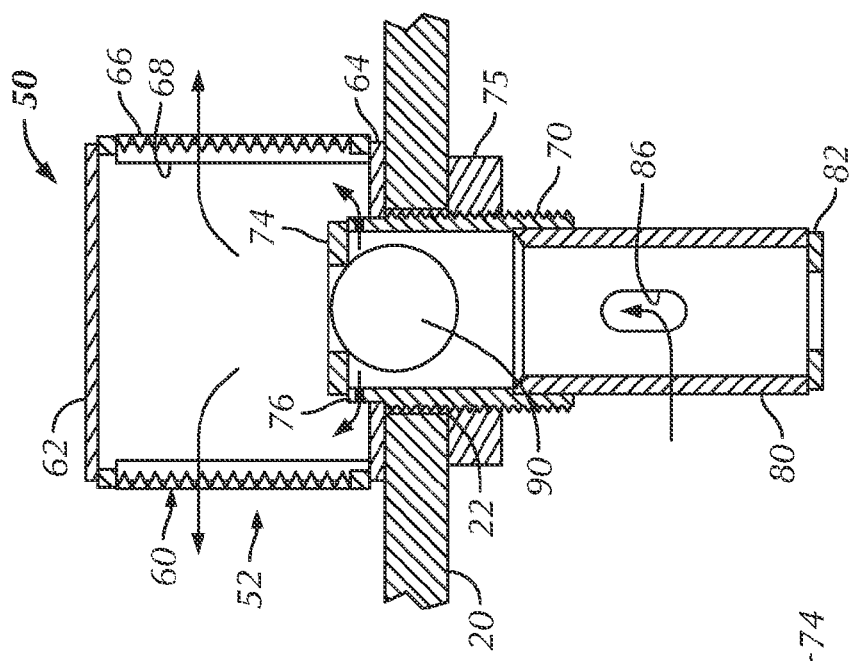
FIG. 3B shows the nozzle in cross-section during flow out of the nozzle.
Figure 3C:
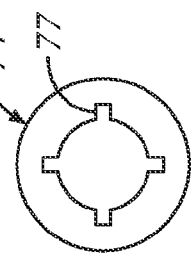
FIG. 3C is a top view of an alternative seat for the nozzle.
Figure 3A:
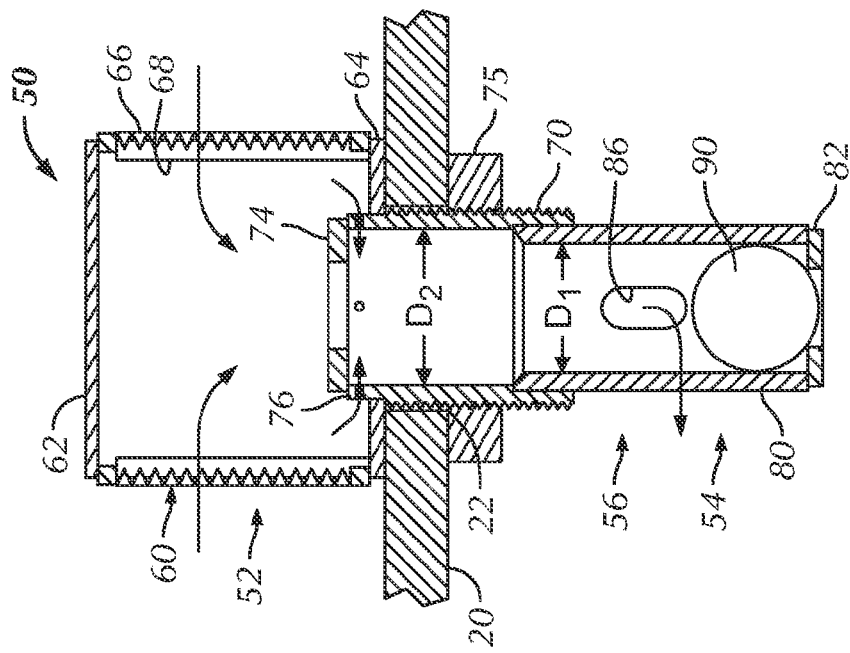
FIG. 3A shows the nozzle in cross-section during flow into the nozzle.

As shown in detail in FIGS. 3A-3B, the screen 60 has a top plate 62, a base plate 64, and one or more screen wires 66 forming a cylindrical screen filter. As shown, the screen 60 of the nozzle 50 can have rods 68 extending between the top plate 62 and base plate 64 at their periphery. The rods 68 can weld to weld rings (not shown) and or to the plates 62/64. The one or more screen wires 66 wind around and attach to these rods 68 to create the cylindrical screen portion of the nozzle 50. Assembly of the wires 66, rods 68, and other components of the screen 60 can use techniques known in the art.

As also shown, the tube member 54 has an outer tube 70 and an inner tube 80. These tubes 70/80 extend from the base plate 64, and the outer tube 70 has an internal dimension or diameter $D_2$ greater than the internal dimension or diameter $D_1$ of the inner tube 80. Use of separate tubes 70/80 facilitates assembly of the nozzle 50, but an alternative embodiment can use a unitary tube member having an internal dimesions that varies between its ends, such as two different internal diameters.

The base plate 64 rests against or near the tube sheet 20, and the tubes 70/80 fit through the opening 22 in the tube sheet 20. A gasket (not shown) can be used between the base plate 64 and tube sheet 20 to meet particular installation requirements. A nut or other fastener 75 attaches to threads on the outer tube 70 to secure the screen nozzle 50 to the tube sheet 20. The nut 75 can be an anchoring nut, and the tube 70 can have standard pipe thread, such as National Standard Free-Fitting Straight Mechanical Pipe thread for a mechanical seal. Other pipe (tapered) or straight threads can be used. In fact, as disclosed elsewhere, a nut or fastener 75 may not be used. Instead, external thread on the outer tube 70 can have pipe threading to affix directly in threaded opening 22 of the installation surface 20 (e.g., tube sheet, lateral pipe, etc.).

In use, the screen 60 retains resin or other process media outside the screen 60, which in this case is on one side of the tube sheet 20. The threaded outer tube 70 and nut 75 secure the nozzle 50 to the tube sheet 20. Internally, the nozzle 50 has the valve 56 to provide flow control either into or out of the nozzle 50 (i.e., into screen 60 and out the other end of the nozzle 50 or vice versa) depending of the flow conditions. In particular, the valve 56 has a valve element 90 disposed in the tubes 70/80 that allows the nozzle 50 to have different flow characteristics depending on the direction of the flow. The valve element 90 can be composed of any suitable material and is preferably composed of a non-metallic material, such as polypropylene, other plastic material, ceramic, or other material depending on the application corrosion potential and fluid characteristics. The valve element 90 as shown is a plug, such as a check ball, but the valve element 90 can be a cylinder or can have any other shape depending on the application and material requirements.

Internally, the ball 90 can move in the tubes 70/80 between upper and lower positions depending on the direction of the flow. In the upper position, the ball 90 can engage an upper seat 74 (which may be referred to as a second seat with a second seat opening), orifice, or the like. In the lower position, the ball 90 can be held in the tube 80 by a bottom seat 82 (which may be referred to as a first seat with a first seat opening), a retention pin, or the like. Thus, the ball 90 acts as a check valve that at least partially blocks flow in one direction only (i.e., flow up the tube member 54). Overall, the orifices, seat 82, and ports 86 of the tubes 70/80 regulate the flow (or block the ball 90 depending on the flow direction).

In general, one or both of the tubes 70/80 can have ports to allow flow to pass. For example, the inner tube 80 defines a number of ports or orifices 86 (which may be referred to as first ports) that allow flow therethrough. The outer tube 70 can also define side ports 76 (which may be referred to as second ports). Alternatively, the seat 74 as shown in FIG. 3C can define an opening with side slots 77. When the check ball 90 rests in the seat 74, upflow of fluid is allowed to pass through the side ports (76; FIG. 3B) or side slots (77; FIG. 3C).

The screen 60 as well as the inner and outer tubes 70/80 are preferably composed of metal and are preassembled by welding and other techniques. For example, the nozzle 50 can be composed of metals, such as stainless steel, Hastelloy, or other alloy so the nozzle 50 can be more durable than plastic nozzles currently used in the art. The two tubes 70/80 can attach to the screen 60 in a number of ways. For example, the outer tube 70 can thread or weld into an opening of the base plate 62 forming the bottom of the screen 60.

For its part, the inner tube 80 can affix into the outer tube 70 in a number of ways. As shown, the end of the inner tube 80 can thread into the end of the outer tube 70. In this arrangement, the screen 60 and outer tube 70 can be separated from the inner tube 80 if maintenance or cleaning is needed. This arrangement also allows the check ball 90 to be composed of non-metallic material (e.g., plastic) so it will not be damaged during welding at assembly.

In one exemplary implementation, the screen 60 can have a width of about 2½ to 3 in. and a height of about 2½ in. Overall, the nozzle 50 can have a height of almost 5 to 6 in. The thickness of the tube sheet 20 or other surface to which the nozzle 50 can attach can be about 0.5 in., although the nozzle 50 can be modified to suit other thicknesses. The outer tube 70 can be over 1½ in. in diameter, and the inner tube 80 can be less than 1½ in. in diameter. The ball 90 can be composed of polypropylene and can have specific gravity of about 0.9 Sg. The specific gravity of the flow control ball 90 may vary with process conditions and nozzle orientation requirements. The screen 60 can have Johnson Screen's 63-wire with 0.007 in. slots therebetween. These dimensions are meant to be exemplary only and can vary depending on the implementation and requirements.

As shown with flow entering the nozzle 50 in FIG. 3A, process flow passes through the screen wires 66 and into the interior the screen 60. The flow then passes through the opening in the seat 74 and into the passage of the tubes 70/80. The flow in this direction moves the ball 90 to its lower position in the inner tube 80 so that the ball 90 engages lower seat 82, which can be a bushing welded to the inner tube 80. Yet, flow in the inner tube 80 is allowed to exit through the one or more ports 86 defined in the sides of the inner tube 80.

Figure 4A:
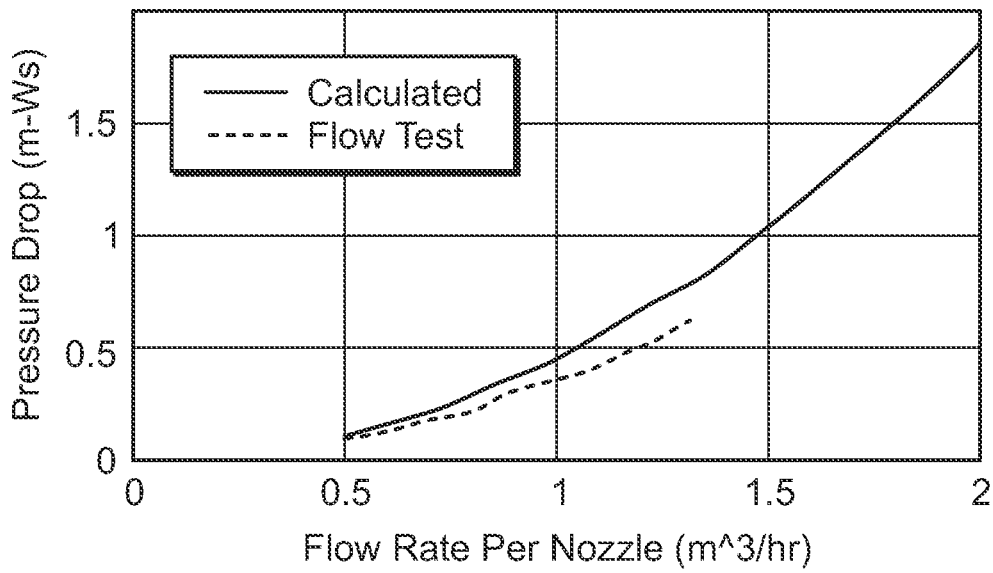
FIG. 4A is a graph showing a pressure drop curve during flow into the nozzle.

As shown in the graph of FIG. 4A, an exemplary curve 100 of the pressure drop (meters of water at standard conditions (m-Ws)) of flow into the nozzle 50 decreases from about 1.8 m-Ws at a flow rate of 2 $m^3$/hr to almost 0.1 m-Ws at a flow rate of 0.5 $m^3$/hr. This is believed to be an acceptable pressure drop for the nozzle 50 at the subject flow rates when used for downflow of process flows, such as resins and the like. The orifice and port sizes can be customized to produce any desired values.

As shown with flow exiting the nozzle 50 in FIG. 3B, process flow passes up the inner tube 80 and into the outer tube 70 where the flow forces the check ball 90 in a closed condition against the seat 74, which restricts the flow into the screen 60. As shown, this seat 74 can be shaped like a flat bushing, although other shapes could be used including a cone-shape such as from a Bellville-type washer or a shape with an uneven edge to allow some flow passage. Meanwhile, the flow can pass out of the side ports (76; FIG. 3B) or seat slots (77; FIG. 3C) and into the interior of the screen 60. This flow can then pass through the screen 60 and into the vessel for upflow or backwash operations.

Figure 4B:
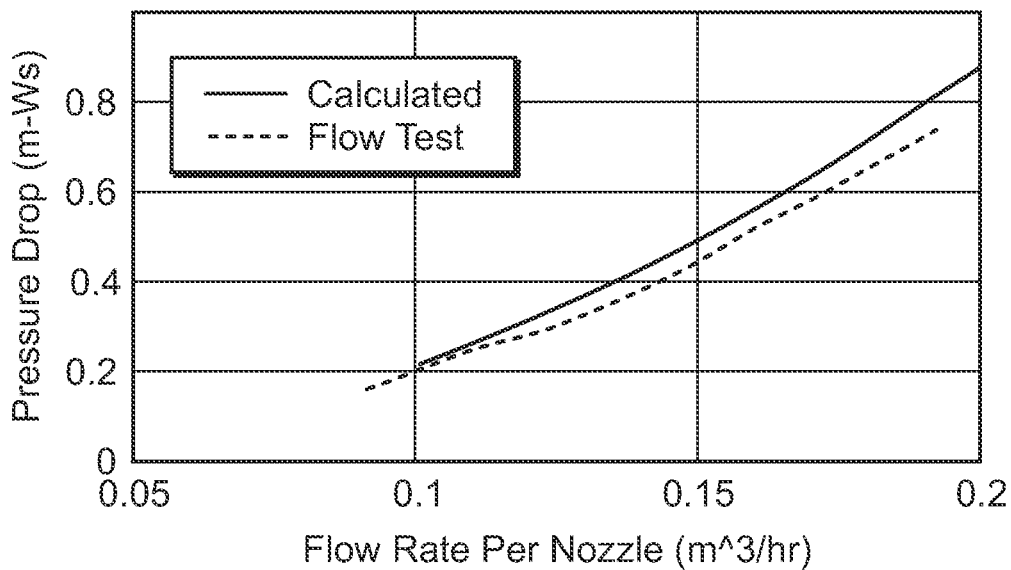
FIG. 4B is a graph showing a pressure drop curve during flow out of the nozzle.

As shown in the graph of FIG. 4B, another exemplary curve 110 of the pressure drop (m-Ws) of flow exiting the nozzle 50 decreases from about 0.9 m-Ws at a flow rate of 0.2 $m^3$/hr to almost 0.2 m-Ws at a flow rate of 0.1 $m^3$/hr. This is believed to be an acceptable pressure drop for flow exiting the nozzle 50 at the subject flow rates when used for upflow of process flows, such as resins and the like. The orifice design and general pipe/nozzle sizing can be varied to suit the flow conditions required for a specific application.

Another variable flow screen nozzle 150 in FIGS. 5A-5B has a head 152 and a tube member 154 extending therefrom. As shown in FIG. 5A, the head 152 disposes adjacent one side of a surface opening 22 in a tube sheet 20 or the like. The head 152 has a screen 160 for passage of fluid flow into and out of an interior of the head 152. The tube member 154 extends from the head 152 through the surface opening 22 and secures the head 152 thereto. The tube member 154 has an internal passage communicating the interior of the head 152 with the opposing side of the surface opening 22.

To control flow, the nozzle 50 includes the valve 156 disposed in the passage of the tube member 154. As before, the valve 156 has a first condition permitting fluid flow in a first direction from the tube member 154 to the interior of the head 152 and has a second condition permitting second fluid flow in a second direction from the interior of the head 152 to the tube member 154. This second fluid flow corresponds to downflow or normal process flow and is greater than the first fluid flow, which corresponds to upflow or backwash.

As shown, the screen 160 has a top plate 162, a base plate 164, and one or more wires 166 forming a cylindrical filter screen. Rods (not shown) can weld to weld rings 167 and/or to the plates 162/164. The one or more screen wires 166 wind around and attach to these rods to create the cylindrical screen portion of the nozzle 150. Assembly of the wires 166, rods, and other components of the screen 160 can use techniques known in the art.

Again, the tube member 154 has an internal dimension that varies between its ends. As shown, the tube member 154 has an outer tube 170 and an inner tube 180 with different diameters ($D_2 > D_1$). The outer tube 170 fits inside the screen 160 through an opening in the base plate 164. The inner tube 180 extends from the base plate 164 and the outer tube 170 and fits through the opening 22 in the tube sheet 20. In this arrangement, the screen 160 and outer tube 170 can be separated from the inner tube 180 if maintenance or cleaning is needed. This also allows the check ball 190 of the valve 156 to be composed of plastic so that it will not be damaged during welding at assembly. Use of separate tubes 170/180 facilitates assembly of the nozzle 150. However, an alternative embodiment can use a unitary tube member having two different internal diameters.

The screen 160 as well as the tubes 170/180 are preferably composed of metal and are preassembled by welding and other techniques. For example, the nozzle 150 can be composed of metals, such as stainless steel, Hastelloy, or other alloy so the nozzle 150 can be more durable than plastic nozzles currently used in the art. The check ball 190 can be composed of plastic, such as polypropylene. Other materials can be used for process conditions that do not allow for the use of polypropylene for the check ball 190.

Details of the outer tube 170 are shown in FIGS. 6B-1 and 6B-2. One end of the outer tube 170 affixes by welding in the opening in the base plate 164. Internally, the outer tube 170 defines an internal thread 177 for mating with the inner tube 180. The outer tube 170 also defines one or more ports or orifices 176 (which may be referred to as second ports) in its side for flow control as described below. A seat 174, such as a bushing, affixes to the top end of the outer tube 170 by welding to create an upper seat for the check ball 190. This seat 174 (which may be referred to as a second seat with a second seat opening) can define side slots in its round opening as described previously to provide a flow passage even when the check ball 190 is seated.

Details of the inner tube 180 are shown in FIGS. 6C-1 and 6C-2. The inner tube 180 has first external threads 187 on a distal end for threading into the outer tube 170 having its internal thread 177. The inner tube 180 also has second external 185 thread for threading the nut 175 thereto. Ports or orifices 186 (which may be referred to as first ports) in the side of the inner tube 180 near the lower end provide flow control as described below. Also at the lower end, a lower seat 182 (which may be referred to as a first seat with a first seat opening), such as a bushing, affixes to the inner tube 180 by welding to create a seat for the check ball 190 during flow control.

The nozzle 150 facilitates assembly and removal for repair. For example, the screen 160 is assembled with the base plate 164 and the outer tube 170, seat 174, and a nut head 163. These various components composed of metal can be welded together using known techniques. Separately, the inner tube 180 can be assembled with its seat 182 welded thereto. The check ball 190 composed of plastic can be inserted in the inner tube 180 after welding has been performed so that the ball 190 does not need to be exposed to the welding process.

To assemble the nozzle 150 on the tube sheet 20 (FIG. 5A), the inner tube 180 inserts through the tube sheet opening 22 with the ball 190 disposed therein and the nut 175 threaded thereon. Operators then thread the screen 160 and outer tube 170 onto the threaded end 187 of the inner tube 180 extending through the tube sheet opening 22. The affixed nut head 163 can be used in conjunction with the nut 175 to secure the nozzle 150 in the opening 22 of the tube sheet 20. As the nozzle 150 is secured, the base plate 164 presses against the tube sheet 20, and the gasket 165 sandwiched between the base plate 164 and the tube sheet 20 can create a seal preventing process flow through the tube sheet opening 22 except through the nozzle 150.

In use, the screen 160 retains resin or other process on one side of the tube sheet 20. The tubes 170/180 and check ball 190 provide flow control by regulating flow either into or out of the nozzle 150 (i.e., into screen 160 and out the other end of the nozzle 150 or vice versa). Thus, the ball 190 in the tubes 170/180 acts as a check valve that at least partially blocks flow in one direction only (i.e., flow up the tubes), and the ports 176, seat 184, and ports 186 regulate the flow (or block the ball 190 depending on the flow direction). The openings in upper seat 174, outer tube 170, and inner tube 180 define the flow passage for downflow through the nozzle 150. In the reverse, the ports 176 in the outer tube define the flow passage for uphole through the nozzle.

For flow control, the inner tube's slots 186 allow passage of process flow into and out of the inner tube 180. The check ball 190 can move in the tubes 170/180 between upper and lower positions depending on the direction of the flow. In the lower position, the ball 190 is held in the tube 180 by the bottom seat 182. In the upper position, the ball 190 engages the upper seat 174. Yet, flow can still pass out of the outer tube 170 into the screen 160 through the side ports 176. The check ball 190 seat plates 174 and 182 can have chamfers or bevels to allow for better contact with the check ball 190.

The ball 190, although seated on the seat 174, does not close flow through the side ports 176. Specifically, the outer tube 170 has internal diameter $D_2$ that is greater than the diameter $D_1$ of the inner tube 180, which is closer to the diameter of the check ball 190. In this way, when the check ball 190 is moved by upflow into the outer tube 170, the diameter of the check ball 190 is less than the diameter $D_2$ of the outer tube 170. This allows flow to pass the seated ball 190 and exit out ports 176. On the other hand, when the check ball 190 is moved by downflow into the inner tube 180, the diameter of the check ball 190 more closely matches the diameter of the inner tube 180 so that its movement is closely covered by flow passing in the inner tube 180. The side ports 176 can be chamfered or beveled to improve the flow distribution pattern or to prevent plugging during operation.

Another variable screen nozzle 250 in FIG. 7 has dual heads 252A-B and a tube member 254 extending therebetween. This nozzle 250 operates similar to those described previously with the inclusion of the second head 252B with its screen 260B providing additional filtering capabilities. This form of nozzle 250 can find application in various process flows.

One head 252A disposes adjacent one side of a surface opening 22 in a tube sheet 20 or the like, while the other head 252B disposes on the other side of the opening 22. Both heads 252A-B have a screen 260A-B for passage of fluid flow into and out of an interior of the head 252A-B similar to that described previously. The tube member 254 extends from the first head 252A through the surface opening 22 and secures the head 252A thereto with a fastener 275.

Similar to previous descriptions, the tube member 254 has an internal passage communicating the interior of the heads 252A-B with the opposing side of the surface opening 22 and has inner and outer tubes 270 and 280. To control flow, the nozzle 250 includes a valve 256 disposed in the passage of the tube member 254. As before, the valve 256 has a ball 290 that moves between first seat 282 and second seat 274 to control fluid flow in opposing directions through the nozzle 250.

The inner tube 280 is similar to that described previously. In the current arrangement, however, the inner tube 280 has the screen 260B communicating with the orifices or ports 286 in the inner tube 280. For assembly, the upper screen 260A and outer tube 270 can fit in the opening 22. Meanwhile, the ball 290 can be positioned in the inner tube 280 already having the other screen 260B attached thereon. For example, the screen 260B can weld onto the inner tube 280. The external threaded end of the inner tube 280 can then thread into the internal thread of the outer tube 270.

In previous descriptions, the variable flow screen nozzles attached to tube sheets using fasteners. In other embodiments, the disclosed nozzles can have external threads directly threading into an installation opening of a tube sheet, pipe, or the like. As shown in FIG. 8, for example, a variable flow screen nozzle 350 threads onto a pipe 310 of a pipe header or lateral system 300. This nozzle 350, which can be similar to that described above in FIGS. 2A-2B, has a screen head 360, an outer tube 370, and an inner tube 380, along with a check ball (not shown) or other valve element. The tubes 370/380 fit through an adapter 320 and pass through an opening 312 in the pipe 310. The external threads 372 on the outer tube 370 thread into internal threads of the opening 312 to hold the screen head 360 on the pipe 310. Although not shown, various seals, gaskets, and the like can be used to seal the outer tube 370 in the pipe opening 312. When installed, the nozzle 350 operates in a similar manner as described previously, controlling fluid flow into and out of the pipe 310.

Figure 9A:
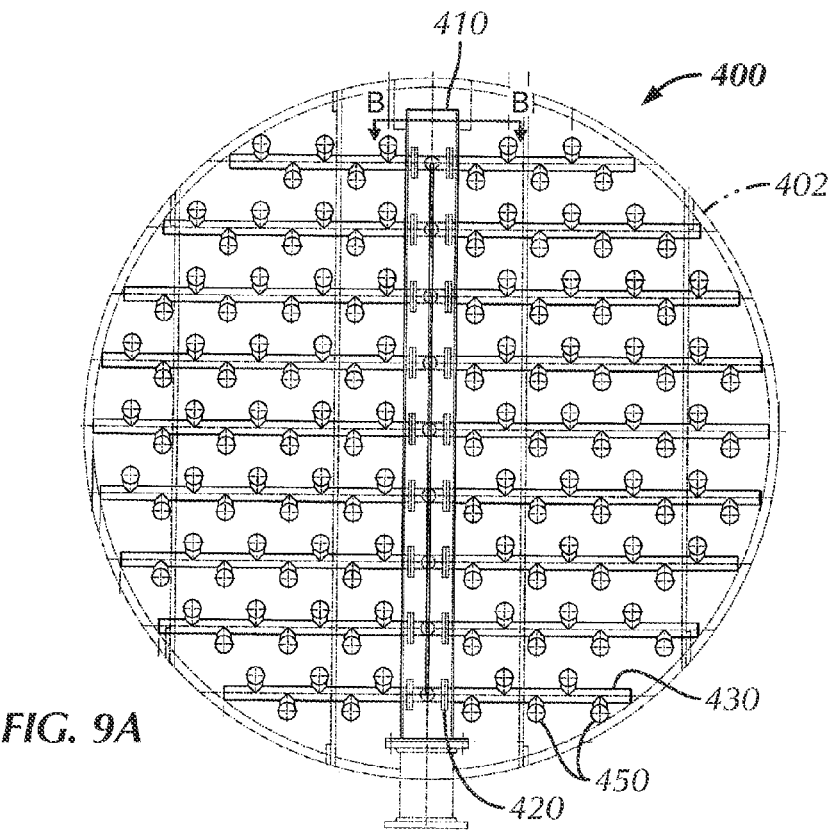
FIG. 9A is a plan view of a pipe header having variable flow screen nozzles according another embodiment of the present disclosure.
Figure 9B:
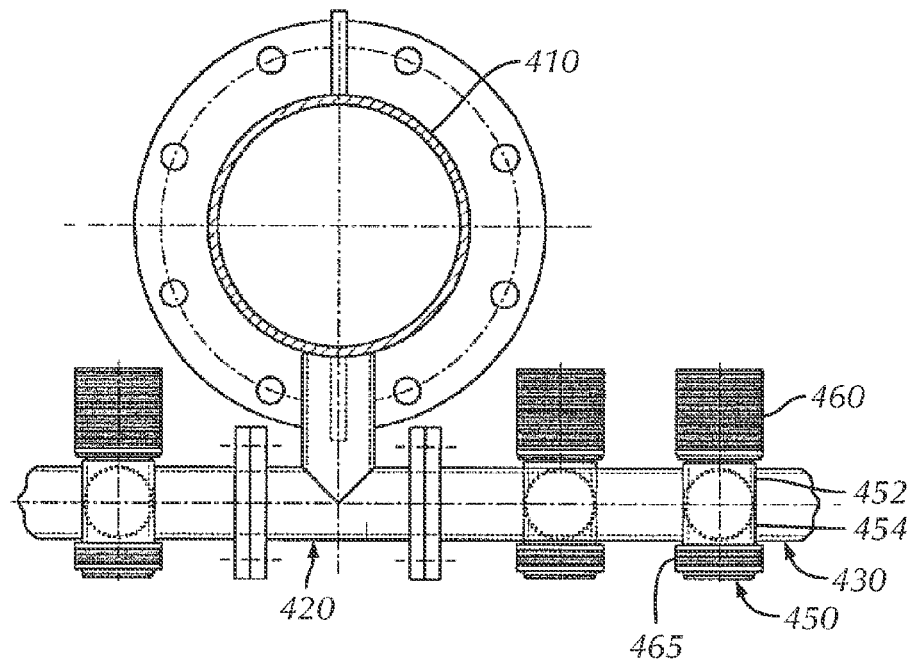
FIG. 9B is an isolated view of a portion of the pipe header having the variable screen nozzles.

In previous descriptions, the variable flow screen nozzles attached to tube sheets, and the previous embodiment of FIG. 8 shows a nozzle 350 affixing directly to a pipe of a pipe header or lateral system. Other arrangements are possible for the disclosed variable flow screen nozzles. Along these lines, FIG. 9A-9B shows a pipe header 400 having variable flow screen nozzles 450 according another embodiment of the present disclosure. As shown in FIG. 9A, the pipe header 400 fits inside a vessel 402 or the like and has a header pipe 410. Tee assemblies 420 attach at various points from the header pipe 410 and connect to pipe laterals 430 using flange connections.

As best shown in FIG. 9B, the variable screen nozzles 450 connect to the pipe laterals 430 in an alternating or serial fashion depending on the implementation. As can be seen, the variable screen nozzle 450 has a hollow body 452 connected to the lateral pipe 430 by a lateral arm 454. A screen head 460 attaches to the hollow body 452, and an ancillary screen 465 is formed around the hollow body 452. As described below, an internal flow control valve inside the nozzle 450 controls fluid flow into and out of the nozzle 450 through the screen head 460 and ancillary screen 465.

FIG. 10A is a side view of the variable screen nozzle 450, and FIG. 10B is a cross-sectional view of the variable screen nozzle 450. Again, the screen head 460 attaches to the hollow body 452, which has the ancillary screen 465 and the lateral arm 454. As best shown in FIG. 10B, the screen head 460 has a top plate 462, a base plate 464, and one or more wires 466 forming a cylindrical filter screen. Rods 468 can weld to a weld ring 467 and/or to the plates 462/464. The one or more screen wires 466 wind around and attach to these rods 468 to create the cylindrical screen portion of the nozzle 450. Assembly of the wires 466, rods 468, and other components of the screen 460 can use techniques known in the art.

As shown, an outer tube 470 and an inner tube 480 have different diameters as before, and the outer tube 470 fits inside the screen head 460 through an opening in the base plate 464. The inner tube 480 extends from the base plate 464 and the outer tube 470 and fits inside the hollow body 452 communicating with the lateral arm 454. The inner tube 480 can thread into the body 452 or can be welded therein.

In one arrangement, the screen head 460 and outer tube 470 may be separable from the inner tube 480 if maintenance or cleaning is needed. This also facilitates assembly of the nozzle 450. One end of the outer tube 470 affixes by welding in the opening in the base plate 464. Internally, the outer tube 470 can define an internal thread for mating with the inner tube 480.

The outer tube 470 may or may not define one or more ports or orifices (not shown) in its side for flow control. Yet, similar to previous embodiments, a seat 474 (which may be referred to as a second seat with a second seat opening), such as a bushing, affixes to the top end of the outer tube 470 by welding to create an upper seat for a check ball 490. This seat 474 may or may not define side slots (not shown) in its round opening as described previously to provide a flow passage even when the check ball 490 is seated.

For its part, the inner tube 480 can have external threads on a distal end for threading into the outer tube 470 having its internal thread. Ports or orifices 486 (which may be referred to as first ports) in the side of the inner tube 480 near the lower end provide flow control as described herein. Also at the lower end, a lower seat 482 (which may be referred to as a first seat with a first seat opening), such as a bushing, affixes to the inner tube 480 by welding to create a seat for the check ball 490 during flow control.

The hollow body 452 has a closed end opposite to the end where the screen head 460 affixes and has the lateral arm 454 extending from the side. However, a number of other configurations could be used, and the body 452 can in fact be a lateral arm for attaching to a pipe lateral of the header system. Nevertheless, the body 452 defines a number of ports 456 and has the ancillary screen 465 attached thereabout. This ancillary screen 465 can be constructed similar to other screens disclosed herein and can use upper and lower weld rings, rods, and wire.

The nozzle 450 facilitates assembly and removal for repair. For example, the screen head 460 is assembled with the base plate 464 and the outer tube 470 and seat 474. These various components are composed of metal and can be welded together using known techniques. Separately, the inner tube 480 can be assembled with its seat 482 welded thereto, and the inner tube 480 can affix in the hollow body 452 by welding, threading, or the like. The check ball 490 composed of plastic or other material can be inserted in the inner tube 480 after welding has been performed so that the ball 490 does not need to be exposed to the welding process.

In use, the screen 460 retains resin or other process media outside the hollow body 452, lateral arm 454, and attached pipe lateral (not shown). The tubes 470/480 and check ball 490 provide flow control by regulating flow either into or out of the nozzle 450. For flow in a first direction into the nozzle 450, flow passes primarily into screen head 460, through seat 474, and into outer and inner tubes 470/480. The flow forces the ball 490 against lower seat 482 and leaves the tube 480 through ports 486. Once inside the body 452, the flow can pass out the lateral arm 454 to other components of the lateral system. Flow may also enter the body 452 and arm 454 by passing through ancillary screen 465 surrounding side ports 456 in the body 452.

For flow in a second direction out of the nozzle 450, flow passes from the lateral system to the lateral arm 454 and the body 452. Entering the inner tube 480 through ports 486 and seat 482, the flow forces the check ball 490 against upper seat 474 primarily closing off flow out screen head 460. Yet, the flow inside the body 452 can pass out the side ports 456 and the ancillary screen 465.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A variable flow control nozzle, comprising:
 a body having an interior, the body including a first seat with a first seat opening passing therethrough, a second seat spaced from the first seat and with a second seat opening passing therethrough, at least one first port, and at least one second port, the at least one first port disposed between the second seat opening and the first seat opening, the seats and ports for passage of fluid into and out of the interior of the body;
 a screen disposed on the body and screening fluid flow into and out of the second seat opening and the at least one second port; and
 a valve disposed in the interior of the body and movable between first and second conditions, the valve in the first condition sealing the first seat opening and permitting first fluid flow from the second seat opening and the at least one second port out the at least one first port, the valve in the second condition sealing the second seat opening and permitting second fluid flow from the first seat opening and the at least one first port out the at least one second port, wherein the first and second fluid flows are not equal to each other.

2. The nozzle of claim 1, wherein the interior of the body has an internal dimension that varies between the first seat opening and the second seat opening.

3. The nozzle of claim 1, wherein the body comprises a tube extending from the screen and defining a flow passage for the interior between the first and second seat openings.

4. The nozzle of claim 3, wherein the valve comprises a plug disposed in the flow passage of the tube and movable between first and second positions, the plug in the first position corresponding to the first condition, the plug in the second position corresponding to the second condition.

5. The nozzle of claim 4, wherein the plug comprises a ball.

6. The nozzle of claim 4, wherein the flow passage of the tube defines first and second internal dimensions respectively associated with the first and second positions of the plug, the first internal dimension being less than the second internal dimension.

7. The nozzle of claim 6, wherein the plug has a third dimension less than or equal to the first internal dimension.

8. The nozzle of claim 4, wherein the first port comprises one or more orifices defined in the tube, the plug in the second position interposed between the one or more orifices and the second seat opening and port, the plug in the first position not interposed between the one or more orifices and the second seat opening and port.

9. The nozzle of claim 4, wherein the second port comprises one or more slits defined in the second seat opening, the plug in the second position engaged with the second seat opening and at least partially permitting the second fluid flow through the one or more slits.

10. The nozzle of claim 4, wherein the second port comprises one or more orifices defined in the tube and communicating the flow passage with the screen, the one or more orifices permitting fluid flow between the flow passage and the screen when the plug is in the first and second positions.

11. The nozzle of claim 1, further comprising another screen disposed on the body adjacent the first seat opening and the first port.

12. The nozzle of claim 1, wherein:
the body comprises a head including a screen for passage of fluid into and out of an interior of the head;
the body further comprises a tube extending from the head, the tube having first and second seat openings separated by a flow passage, the second seat opening disposed in the head and the first seat opening disposed outside the head, the tube defining the first port adjacent the first seat opening and defining the second port adjacent the second seat opening, the second seat opening and the second port communicating the flow passage with the interior of the head; and
the valve comprises a plug disposed in the flow passage of the tube and movable between first and second positions, the plug being positioned by flow from the second seat in a first direction to be in the first position sealing the first seat opening and permitting first fluid flow in the first direction from the interior of the head out the at least one first port, the plug being positioned by flow from the first seat in a second direction to be in the second position sealing the second seat opening and permitting second fluid flow in the second direction from the flow passage to the interior of the head through the at least one second port.

13. The nozzle of claim 12, wherein the second fluid flow is greater than the first fluid flow.

14. The nozzle of claim 12, wherein the flow passage of the tube has an internal dimension that varies between the first seat opening and the seat opening.

15. The nozzle of claim 12, wherein the plug comprises a ball disposed in the flow passage of the tube and movable between the first and second seat openings.

16. The nozzle of claim 12, wherein the flow passage of the tube defines first and second internal dimensions respectively associated with the first and second positions of the plug, the first internal dimension being less than the second internal dimension.

17. The nozzle of claim 16, wherein the plug has a third dimension less than or equal to the first internal dimension.

18. The nozzle of claim 12, wherein the tube comprises:
a first tube member having a first internal dimension for the flow passage; and
a second tube member coupled between the first tube member and the head and having a second internal dimension for the flow passage, the second internal dimension being greater than the first internal dimension.

19. A variable flow control nozzle, comprising:
a body having an interior and comprising:
a head including a screen for passage of fluid into and out of an interior of the head,
a first seat with a first seat opening passing therethrough, a second seat spaced from the first seat and with a second seat opening passing therethrough, at least one first port, and at least one second port, the at least one first port disposed between the second seat opening and the first seat opening, the seats and ports for passage of fluid into and out of the interior of the body; and
a tube extending from the head, the tube comprising a first tube member having a first internal dimension for the flow passage;
a screen disposed on the body and screening fluid flow into and out of the second seat opening and the at least one second port; and
a valve comprising a plug disposed in the flow passage of the tube in the interior of the body and movable between first and second conditions, the valve in the first condition sealing the first seat opening and permitting first fluid flow in the first direction from the interior of the head, the second seat opening, and the at least one second port out the at least one first port, the valve in the second condition sealing the second seat opening and permitting second fluid flow in the second direction from the flow passage, the first seat opening, and the at least one first port to out the at least one second port and to the interior of the head,
a second tube member coupled between the first tube member and the head and having a second internal dimension for the flow passage, the second internal dimension being greater than the first internal dimension the tube having first and second seat openings separated by a flow passage, the tube defining the first port adjacent the first seat opening and defining the second port adjacent the second seat opening, the second seat opening and the second port communicating the flow passage with the interior of the head, wherein the second tube member disposes at least partially inside the interior of the head and has an internal thread, and wherein the first tube member defines a first external thread connecting to the internal thread of the second tube member; and
wherein the first and second fluid flows are not equal to each other.

20. A variable flow control nozzle, comprising:
a body having an interior and comprising:
  a head including a screen for passage of fluid into and out of an interior of the head,
  a first seat with a first seat opening passing therethrough, a second seat spaced from the first seat and with a second seat opening passing therethrough, at least one first port, and at least one second port, the at least one first port disposed between the second seat opening and the first seat opening, the seats and ports for passage of fluid into and out of the interior of the body; and
  a tube extending from the head, the tube comprising a first tube member having a first internal dimension for the flow passage, wherein the first tube member defines a second external thread thereabout, and wherein a fastener threads onto the second external thread and secures the first tube member to a surface opening;
a screen disposed on the body and screening fluid flow into and out of the second seat opening and the at least one second port; and
a valve comprising a plug disposed in the flow passage of the tube in the interior of the body and movable between first and second conditions, the valve in the first condition sealing the first seat opening and permitting first fluid flow in the first direction from the interior of the head, the second seat opening, and the at least one second port out the at least one first port, the valve in the second condition sealing the second seat opening and permitting second fluid flow in the second direction from the flow passage, the first seat opening, and the at least one first port to out the at least one second port and to the interior of the head,
a second tube member coupled between the first tube member and the head and having a second internal dimension for the flow passage, the second internal dimension being greater than the first internal dimension the tube having first and second seat openings separated by a flow passage, the tube defining the first port adjacent the first seat opening and defining the second port adjacent the second seat opening, the second seat opening and the second port communicating the flow passage with the interior of the head; and
wherein the first and second fluid flows are not equal to each other.

21. The nozzle of claim 12, wherein the nozzle comprises a body having another interior communicating with the first seat opening and the first port of the tube and having another screen for passage of fluid flow therethrough.

22. The nozzle of claim 21, wherein the body comprises a flow tube communicating the other interior outside the body.

23. The nozzle of claim 21, wherein the body defines one or more orifices communicating the other interior outside the body, and wherein the other screen is disposed on the body adjacent the one or more orifices.

24. A flow assembly, comprising:
a flow barrier dividing first and second processes from one another; and
one or more variable flow control nozzles disposed on the flow barrier, each of the one or more the nozzles comprising:
  a body having an interior, the body including a first seat with a first seat opening passing therethrough, a second seat spaced from the first seat and with a second seat opening passing therethrough, at least one first port, and at least one second port, the at least one first port disposed between the second seat opening and the first seat opening, the seats and ports for passage of fluid into and out of the interior of the body;
  a screen disposed on the body and screening fluid flow into and out of the second seat opening and the at least one second port; and
  a valve disposed in the interior of the body and movable between first and second conditions, the valve being positioned by fluid flow in a first direction to be in the first condition, the valve in the first condition sealing the first seat opening and permitting first fluid flow from the second seat opening and the at least one second port out the first port, the valve being positioned by fluid flow in a second direction to be in the second condition, the valve in the second condition sealing the second seat opening and permitting second fluid flow from the first seat opening and the first port out the second port,
  wherein the first and second fluid flows are not equal to each other.

25. The assembly of claim 24, wherein the flow barrier is selected from the group consisting of a tube sheet, a pipe, and a header.

* * * * *